United States Patent
Schwartz et al.

(10) Patent No.: US 9,798,429 B2
(45) Date of Patent: Oct. 24, 2017

(54) GUARD ELECTRODES IN A SENSING STACK

(71) Applicant: Synaptics Incorporated, San Jose, CA (US)

(72) Inventors: Adam Schwartz, Redwood City, CA (US); Joseph Kurth Reynolds, Alviso, CA (US); Bob Lee Mackey, Santa Clara, CA (US); Petr Shepelev, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 91 days.

(21) Appl. No.: 14/632,226

(22) Filed: Feb. 26, 2015

(65) Prior Publication Data

US 2015/0248183 A1 Sep. 3, 2015

Related U.S. Application Data

(60) Provisional application No. 61/945,958, filed on Feb. 28, 2014.

(51) Int. Cl.
*G06F 3/045* (2006.01)
*G06F 3/044* (2006.01)

(52) U.S. Cl.
CPC .... *G06F 3/044* (2013.01); *G06F 2203/04112* (2013.01)

(58) Field of Classification Search
CPC .............. G06F 3/044; G06F 3/045; G06F 2203/04101; G06F 2203/04113; G06F 3/0412; G06F 3/041; G06F 2203/04112
See application file for complete search history.

(56) References Cited

U.S. PATENT DOCUMENTS

| 4,087,625 A | 5/1978 | Dym et al. |
| 4,233,522 A | 11/1980 | Grummer et al. |

(Continued)

FOREIGN PATENT DOCUMENTS

| CN | 2436978 Y | 6/2001 |
| CN | 1490713 A | 4/2004 |

(Continued)

OTHER PUBLICATIONS

Quantum Research Group. "Qmatrix Technology White Paper", 2006. 4 Pages.
Lubart, et al. "One Layer Optically Transparent Keyboard for Input Display", IP.com. Mar. 1, 1979. 3 Pages.
Gary L. Barrett et al. "Projected Capacitive Touch Screens", iTouchInternational. 9 pages.
Quantum Research Application Note An—KD01. "Qmatrix Panel Design Guidelines", Oct. 10, 2002. 4 Pages.

(Continued)

*Primary Examiner* — Towfiq Elahi
(74) *Attorney, Agent, or Firm* — Patterson & Sheridan, LLP

(57) ABSTRACT

This disclosure generally provides an input device that includes a multi-layered capacitive sensor which includes a first layer disposed over a second layer that contains a plurality of sensor electrodes coupled to respective traces. The first and second layers form a capacitive sensing stack where the first layer is between the second layer and a touch surface for interacting with the input object. The first and second layers may be disposed on either the same substrate or different substrates in the stack. In one embodiment, the first layer includes electrically floating electrodes and at least one guard electrode. These components may align with respective components in the second layer. For example, the electrically floating electrodes in the first layer may at least partially cover the sensor electrodes in the second layer.

21 Claims, 6 Drawing Sheets

(56) References Cited

U.S. PATENT DOCUMENTS

| | | |
|---|---|---|
| 4,237,421 A | 12/1980 | Waldron |
| 4,264,903 A | 4/1981 | Bigelow |
| 4,293,987 A | 10/1981 | Gottbreht et al. |
| 4,484,026 A | 11/1984 | Thornburg |
| 4,492,958 A | 1/1985 | Minami |
| 4,550,221 A | 10/1985 | Mabusth |
| 4,659,874 A | 4/1987 | Landmeier |
| 4,667,259 A | 5/1987 | Uchida et al. |
| 4,677,259 A | 6/1987 | Abe |
| 4,705,919 A | 11/1987 | Dhawan |
| 4,771,138 A | 9/1988 | Dhawan |
| 4,878,013 A | 10/1989 | Andermo |
| 4,954,823 A | 9/1990 | Binstead |
| 4,999,462 A | 3/1991 | Purcell |
| 5,053,715 A | 10/1991 | Andermo |
| 5,062,916 A | 11/1991 | Aufderheide et al. |
| 5,239,307 A | 8/1993 | Andermo |
| 5,341,233 A | 8/1994 | Tomoike et al. |
| 5,459,463 A | 10/1995 | Gruaz et al. |
| 5,463,388 A | 10/1995 | Boie et al. |
| 5,650,597 A | 7/1997 | Redmayne |
| 5,657,012 A | 8/1997 | Tait |
| 5,777,596 A | 7/1998 | Herbert |
| 5,841,078 A | 11/1998 | Miller et al. |
| 5,869,790 A | 2/1999 | Shigetaka et al. |
| 5,929,472 A * | 7/1999 | Kniffin ............... G01P 15/0802 257/254 |
| 6,188,391 B1 | 2/2001 | Seely et al. |
| 6,222,522 B1 | 4/2001 | Mathews et al. |
| 6,256,022 B1 | 7/2001 | Manaresi et al. |
| 6,281,888 B1 | 8/2001 | Hoffman et al. |
| 6,288,707 B1 | 9/2001 | Philipp |
| 6,297,811 B1 | 10/2001 | Kent et al. |
| 6,307,751 B1 | 10/2001 | Bodony et al. |
| 6,320,394 B1 | 11/2001 | Tartagni |
| 6,362,633 B1 | 3/2002 | Tartagni |
| 6,380,930 B1 | 4/2002 | Van Ruymbeke |
| 6,452,514 B1 | 9/2002 | Philipp |
| 6,459,044 B2 | 10/2002 | Watanabe et al. |
| 6,486,862 B1 | 11/2002 | Jacobsen et al. |
| 6,512,381 B2 | 1/2003 | Kramer |
| 6,535,200 B2 | 3/2003 | Philipp |
| 6,583,632 B2 | 6/2003 | Von Basse et al. |
| 6,653,736 B2 | 11/2003 | Kishimoto et al. |
| 6,731,120 B2 | 5/2004 | Tartagni |
| 6,771,327 B2 | 8/2004 | Sekiguchi |
| 6,825,833 B2 | 11/2004 | Mulligan et al. |
| 6,879,930 B2 | 4/2005 | Sinclair et al. |
| 6,910,634 B1 | 6/2005 | Inose et al. |
| 6,929,001 B2 | 8/2005 | Yoon |
| 6,937,031 B2 | 8/2005 | Yoshioka et al. |
| 6,998,855 B2 | 2/2006 | Tartagni |
| 7,129,935 B2 | 10/2006 | Mackey |
| 7,158,125 B2 | 1/2007 | Sinclair et al. |
| 7,218,314 B2 | 5/2007 | Itoh |
| 7,288,946 B2 | 10/2007 | Hargreaves et al. |
| 7,306,144 B2 | 12/2007 | Moore |
| 7,327,352 B2 | 2/2008 | Keefer et al. |
| 7,339,579 B2 | 3/2008 | Richter et al. |
| 7,348,967 B2 | 3/2008 | Zadesky et al. |
| 7,382,139 B2 | 6/2008 | Mackey |
| 7,388,571 B2 | 6/2008 | Lowles et al. |
| 7,423,219 B2 | 9/2008 | Kawaguchi et al. |
| 7,423,635 B2 | 9/2008 | Taylor et al. |
| 7,439,962 B2 | 10/2008 | Reynolds et al. |
| 7,455,529 B2 | 11/2008 | Fujii et al. |
| 7,522,230 B2 | 4/2009 | Lee |
| 7,548,073 B2 | 6/2009 | Mackey et al. |
| 7,554,531 B2 | 6/2009 | Baker et al. |
| 7,589,713 B2 | 9/2009 | Sato |
| 7,663,607 B2 | 2/2010 | Hotelling et al. |
| 7,724,243 B2 | 5/2010 | Geaghan |
| 7,768,273 B1 | 8/2010 | Kalnitsky et al. |
| 7,786,981 B2 | 8/2010 | Proctor |
| 7,808,255 B2 | 10/2010 | Hristov et al. |
| 7,812,825 B2 | 10/2010 | Sinclair et al. |
| 7,821,274 B2 | 10/2010 | Philipp et al. |
| 7,821,502 B2 | 10/2010 | Hristov |
| 7,864,160 B2 | 1/2011 | Geaghan et al. |
| 7,876,309 B2 | 1/2011 | XiaoPing |
| 7,973,771 B2 | 7/2011 | Geaghan |
| 7,977,953 B2 | 7/2011 | Lee |
| 7,986,152 B2 | 7/2011 | Philipp et al. |
| 8,040,326 B2 | 10/2011 | Hotelling et al. |
| 8,059,015 B2 | 11/2011 | Hua et al. |
| 8,125,463 B2 | 2/2012 | Hotelling et al. |
| 8,243,027 B2 | 8/2012 | Hotelling et al. |
| 8,259,078 B2 | 9/2012 | Hotelling et al. |
| 8,278,571 B2 | 10/2012 | Orsley |
| 8,319,747 B2 | 11/2012 | Hotelling et al. |
| 8,599,150 B2 | 12/2013 | Phillip |
| 8,653,834 B2 | 2/2014 | Reynolds |
| 2002/0077313 A1 | 6/2002 | Clayman |
| 2003/0052867 A1 | 3/2003 | Shigetaka et al. |
| 2003/0103043 A1 | 6/2003 | Mulligan et al. |
| 2003/0215976 A1 | 11/2003 | Chou et al. |
| 2003/0234771 A1 | 12/2003 | Mulligan et al. |
| 2004/0062012 A1 | 4/2004 | Murohara |
| 2004/0077313 A1 | 4/2004 | Oba et al. |
| 2004/0125087 A1 | 7/2004 | Taylor et al. |
| 2004/0222974 A1 | 11/2004 | Hong et al. |
| 2004/0239650 A1 | 12/2004 | Mackey |
| 2004/0252109 A1 | 12/2004 | Trent et al. |
| 2005/0030048 A1 | 2/2005 | Bolender et al. |
| 2006/0038754 A1 | 2/2006 | Kim |
| 2006/0097991 A1* | 5/2006 | Hotelling ............... G06F 3/0416 345/173 |
| 2006/0114240 A1 | 6/2006 | Lin |
| 2006/0114241 A1 | 6/2006 | Lin |
| 2006/0232600 A1 | 10/2006 | Kimura et al. |
| 2007/0008299 A1 | 1/2007 | Hristov |
| 2007/0222762 A1 | 9/2007 | Van Delden et al. |
| 2007/0229466 A1 | 10/2007 | Peng et al. |
| 2007/0229468 A1 | 10/2007 | Peng et al. |
| 2007/0229469 A1 | 10/2007 | Seguine |
| 2007/0229470 A1 | 10/2007 | Snyder et al. |
| 2007/0242054 A1 | 10/2007 | Chang et al. |
| 2007/0257894 A1 | 11/2007 | Philipp |
| 2007/0262962 A1 | 11/2007 | XiaoPing et al. |
| 2007/0262963 A1 | 11/2007 | Xiao-Ping et al. |
| 2007/0268265 A1 | 11/2007 | XiaoPing |
| 2007/0273659 A1 | 11/2007 | XiaoPing et al. |
| 2007/0273660 A1 | 11/2007 | XiaoPing |
| 2007/0279395 A1 | 12/2007 | Philipp et al. |
| 2007/0291009 A1 | 12/2007 | Wright et al. |
| 2008/0006453 A1 | 1/2008 | Hotelling |
| 2008/0007534 A1 | 1/2008 | Peng et al. |
| 2008/0007539 A1 | 1/2008 | Hotelling |
| 2008/0062140 A1 | 3/2008 | Hotelling et al. |
| 2008/0074398 A1 | 3/2008 | Wright |
| 2008/0111795 A1 | 5/2008 | Bollinger |
| 2008/0117182 A1 | 5/2008 | Um et al. |
| 2008/0150906 A1 | 6/2008 | Grivna |
| 2008/0158172 A1 | 7/2008 | Hotelling et al. |
| 2008/0158181 A1 | 7/2008 | Hamblin et al. |
| 2008/0164076 A1 | 7/2008 | Orsley |
| 2008/0218488 A1 | 9/2008 | Yang et al. |
| 2008/0245582 A1 | 10/2008 | Bytheway |
| 2008/0259044 A1 | 10/2008 | Utsunomiya et al. |
| 2008/0264699 A1 | 10/2008 | Chang et al. |
| 2008/0265914 A1 | 10/2008 | Matsushima |
| 2008/0297176 A1 | 12/2008 | Douglas |
| 2008/0308323 A1 | 12/2008 | Huang et al. |
| 2008/0309634 A1 | 12/2008 | Hotelling et al. |
| 2008/0309635 A1 | 12/2008 | Matsuo |
| 2009/0002337 A1 | 1/2009 | Chang |
| 2009/0002338 A1 | 1/2009 | Kinoshita et al. |
| 2009/0040191 A1 | 2/2009 | Tong et al. |
| 2009/0046077 A1 | 2/2009 | Tanaka et al. |
| 2009/0091551 A1 | 4/2009 | Hotelling et al. |
| 2009/0096757 A1 | 4/2009 | Hotelling et al. |
| 2009/0107737 A1 | 4/2009 | Reynolds et al. |
| 2009/0128518 A1 | 5/2009 | Kinoshita et al. |
| 2009/0135151 A1 | 5/2009 | Sun |

(56) References Cited

U.S. PATENT DOCUMENTS

| | | |
|---|---|---|
| 2009/0153509 A1 | 6/2009 | Jiang et al. |
| 2009/0160682 A1 | 6/2009 | Bolender et al. |
| 2009/0185100 A1 | 7/2009 | Matsuhira et al. |
| 2009/0194344 A1 | 8/2009 | Harley et al. |
| 2009/0201267 A1 | 8/2009 | Akimoto et al. |
| 2009/0207154 A1 | 8/2009 | Chino |
| 2009/0213082 A1 | 8/2009 | Ku |
| 2009/0213534 A1 | 8/2009 | Sakai |
| 2009/0236151 A1 | 9/2009 | Yeh et al. |
| 2009/0256821 A1 | 10/2009 | Mamba et al. |
| 2009/0262096 A1 | 10/2009 | Teramoto |
| 2009/0267916 A1 | 10/2009 | Hotelling |
| 2009/0273571 A1 | 11/2009 | Bowens |
| 2009/0273573 A1 | 11/2009 | Hotelling |
| 2009/0277695 A1 | 11/2009 | Liu et al. |
| 2009/0283340 A1 | 11/2009 | Liu et al. |
| 2009/0303203 A1 | 12/2009 | Yilmaz et al. |
| 2009/0309850 A1 | 12/2009 | Yang |
| 2009/0314621 A1 | 12/2009 | Hotelling |
| 2009/0324621 A1 | 12/2009 | Senter et al. |
| 2010/0001966 A1 | 1/2010 | Lii et al. |
| 2010/0006347 A1 | 1/2010 | Yang |
| 2010/0013745 A1 | 1/2010 | Kim et al. |
| 2010/0013800 A1 | 1/2010 | Elias et al. |
| 2010/0020032 A1 | 1/2010 | Mamba et al. |
| 2010/0044122 A1 | 2/2010 | Sleeman et al. |
| 2010/0090979 A1 | 4/2010 | Bae |
| 2010/0134422 A1 | 6/2010 | Borras |
| 2010/0140359 A1 | 6/2010 | Hamm et al. |
| 2010/0147600 A1 | 6/2010 | Orsley |
| 2010/0149108 A1 | 6/2010 | Hotelling et al. |
| 2010/0149117 A1* | 6/2010 | Chien .......... G06F 3/0412 345/173 |
| 2010/0156839 A1 | 6/2010 | Ellis |
| 2010/0163394 A1 | 7/2010 | Tang et al. |
| 2010/0182273 A1 | 7/2010 | Noguchi et al. |
| 2010/0188359 A1 | 7/2010 | Lee |
| 2010/0200309 A1* | 8/2010 | Yilmaz .......... G06F 3/016 178/18.03 |
| 2010/0214247 A1 | 8/2010 | Tang et al. |
| 2010/0220075 A1 | 9/2010 | Kuo et al. |
| 2010/0253646 A1 | 10/2010 | Hiratsuka |
| 2010/0258360 A1 | 10/2010 | Yilmaz |
| 2010/0265210 A1 | 10/2010 | Nakanishi et al. |
| 2010/0265212 A1 | 10/2010 | Sekiguchi et al. |
| 2010/0271330 A1 | 10/2010 | Philipp |
| 2010/0277433 A1 | 11/2010 | Lee et al. |
| 2010/0289770 A1 | 11/2010 | Lee et al. |
| 2010/0291973 A1 | 11/2010 | Nakahara et al. |
| 2010/0302201 A1 | 12/2010 | Ritter et al. |
| 2010/0321043 A1 | 12/2010 | Philipp et al. |
| 2010/0321326 A1 | 12/2010 | Grunthaner et al. |
| 2011/0018841 A1 | 1/2011 | Hristov |
| 2011/0022351 A1 | 1/2011 | Philipp et al. |
| 2011/0025639 A1 | 2/2011 | Trend et al. |
| 2011/0048812 A1 | 3/2011 | Yilmaz |
| 2011/0048813 A1 | 3/2011 | Yilmaz |
| 2011/0057887 A1 | 3/2011 | Lin et al. |
| 2011/0062969 A1 | 3/2011 | Hargreaves et al. |
| 2011/0062971 A1 | 3/2011 | Badaye |
| 2011/0063251 A1 | 3/2011 | Geaghan et al. |
| 2011/0080357 A1 | 4/2011 | Park et al. |
| 2011/0090159 A1 | 4/2011 | Kurashima |
| 2011/0096016 A1 | 4/2011 | Yilmaz |
| 2011/0102361 A1* | 5/2011 | Philipp .......... G06F 3/044 345/174 |
| 2011/0109579 A1 | 5/2011 | Wang et al. |
| 2011/0109590 A1 | 5/2011 | Park |
| 2011/0141051 A1 | 6/2011 | Ryu |
| 2011/0169770 A1 | 7/2011 | Mishina et al. |
| 2011/0175671 A1* | 7/2011 | Reynolds .......... G06F 3/044 327/517 |
| 2011/0187666 A1 | 8/2011 | Min |
| 2011/0267300 A1 | 11/2011 | Serban et al. |
| 2011/0273391 A1 | 11/2011 | Bae |
| 2012/0044171 A1 | 2/2012 | Lee et al. |
| 2012/0050216 A1 | 3/2012 | Kremin et al. |
| 2012/0056820 A1 | 3/2012 | Corbridge |
| 2012/0313901 A1 | 12/2012 | Monson |
| 2015/0233696 A1* | 8/2015 | Matsumoto .......... G01D 5/2417 324/688 |

FOREIGN PATENT DOCUMENTS

| | | |
|---|---|---|
| EP | 0810540 A2 | 12/1997 |
| EP | 0919945 A2 | 6/1999 |
| EP | 0977159 A1 | 2/2000 |
| EP | 2002-268786 A2 | 9/2002 |
| JP | 2002-215330 A | 8/2002 |
| JP | 2002268768 A | 9/2002 |
| JP | 2011002947 A | 1/2011 |
| JP | 2011002948 A | 1/2011 |
| JP | 2011002949 A | 1/2011 |
| JP | 2011002950 A | 1/2011 |
| JP | 2011004076 A | 1/2011 |
| JP | 2011100379 A | 5/2011 |
| KR | 10110118065 | 1/2012 |
| WO | 86/06551 A1 | 11/1986 |
| WO | 0057344 A1 | 9/2000 |
| WO | 2010117946 A2 | 10/2010 |
| WO | 2010136932 A1 | 12/2010 |

OTHER PUBLICATIONS

Calvin Wang et al. "Single Side All-Point-Addressable Clear Glass Substrate Sensor Design", IP.com. Apr. 2, 2009. 3 Pages.

Tsz-Kin Ho et al. "32.3: Simple Single-Layer Multi-Touch Projected Capacitive Touch Panel", SID 09 Digest.

Johannes Schoning et al. "Multi-Touch Surfaces: A Technical Guide", Technical Report TUM-I0833. 2008.

Shawn Day. "Low Cost Touch Sensor on the Underside of a Casing", IP.com. Oct. 14, 2004.

Ken Gilleo. "The Circuit Centennial", 16 Pages.

Ken Gilleo, "The Definitive History of the Printed Circuit", 1999 PC Fab.

Hal Philipp. "Charge Transfer Sensing", vol. 19, No. 2. 1999. pp. 96-105.

Paul Leopardi, "A Partition of the Unit Sphere into Regions of Equal Area and Small Diameter", 2005.

Olivier Bau, "TeslaTouch: Electrovibration for Touch Surfaces", 2010.

Colin Holland. "SID: Single Layer Technology Boosts Capacitive Touchscreens", www.eetimes.com/General. 2011.

"Novel Single Layer Touchscreen Based on Indium", 2011.

"Mesh Patterns for Capacitive Touch or Proximity Sensors", IP.com. May 14, 2010. 3pages.

"IDT Claims World's First True Single-Layer Multi-Touch Projected Capacitive Touch Screen Technology", EE Times Europe. Dec. 8, 2010.

Tracy V. Wilson et al. "How the iPhone Works", HowStuffWorks "Multi-touch Systems". 2011.

Sunkook Kim et al. "A Highly Sensitive Capacitive Touch Sensor Integrated on a Thin-Film-Encapsulated Active-Matrix OLED for Ultrathin Displays", IEEE Transactions on Electron Devices, vol. 58, No. 10, Oct. 2011.

Mike Williams, "Dream Screens from Graphene", Technology Developed at Rice could Revolutionize Touch-Screen Displays. Aug. 2011.

ASIC Packaging Guidebook, Toshiba Corporation. (2000). 35 pages.

Fujitsu Microelectronics Limited. "IC Package." (2002). 10 pages.

International Search Report, PCT/US2013/021314 dated Jun. 25, 2013.

* cited by examiner

GUARD ELECTRODES IN A SENSING STACK

CROSS REFERENCE TO RELATED APPLICATIONS

This application claims priority to provisional U.S. patent application Ser. No. 61/945,958, filed Feb. 28, 2014. The aforementioned related patent application is herein incorporated by reference in its entirety.

BACKGROUND

Field

Embodiments of the present invention generally relate to electronic devices, and more specifically, to multi-layer capacitive sensing stacks.

Background of the Invention

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in or peripheral to, notebook or desktop computers). Proximity sensor devices are also often used in smaller computing systems (such as touch screens integrated in cellular phones).

BRIEF SUMMARY OF THE INVENTION

One embodiment described herein includes a capacitive sensing device comprising a first layer in a sensing stack which includes a plurality of electrically floating electrodes and a guard electrode and a second layer in the sensing stack ohmically insulated from the first layer. The second layer includes a plurality of sensor electrodes each coupled to a respective routing trace, where each of the electrically floating electrodes at least partially overlaps a corresponding one of the sensor electrodes in the sensing stack, and the guard electrode at least partially overlaps one of the routing traces in the sensing stack. A processing system coupled to the plurality of sensor electrodes via the routing traces and is configured to drive sensing signals onto the routing traces for performing capacitive sensing.

Another embodiment described herein includes a capacitive sensing stack a first layer comprising a plurality of electrically floating electrodes and a first guard electrode and a second layer ohmically insulated from the first layer. The second layer includes a plurality of sensor electrodes each coupled to a respective routing trace, where each of the electrically floating electrodes at least partially overlaps a corresponding one of the sensor electrodes in the capacitive sensing stack, and the first guard electrode at least partially overlaps one of the routing traces in the capacitive sensing stack. The stack also includes a protective cover providing a touch surface, where the first layer is between the protective cover and the second layer.

Another embodiment described herein is a method that includes disposing a first layer onto a first surface where the first layer includes a plurality of electrically floating electrodes and a guard electrode and disposing a second layer onto a second, different surface, where the second layer comprises a plurality of sensor electrodes each coupled to a respective routing trace. The method also includes forming a capacitive sensing stack including the first and second layers, where each of the electrically floating electrodes at least partially overlaps a corresponding one of the sensor electrodes in the capacitive sensing stack, and the guard electrode at least partially overlaps one of the routing traces in the capacitive sensing stack. The method includes disposing a protective cover onto the capacitive sensing stack such that the first layer is between the protective cover and the second layer. Furthermore, the protective cover comprises a touch surface.

BRIEF DESCRIPTION OF DRAWINGS

So that the manner in which the above recited features of the present invention can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
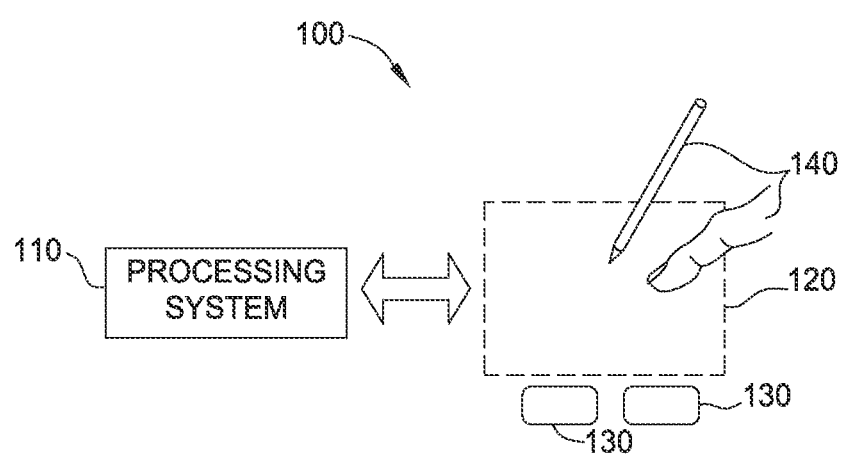
FIG. 1 is a block diagram of an exemplary system that includes an input device in accordance with an embodiment of the invention.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or its application and uses. Furthermore, there is no intention to be bound by any expressed or implied theory presented in the preceding technical field, background, brief summary or the following detailed description.

Various embodiments of the present invention include a multi-layered sensing stack in an input device for performing capacitive sensing. In one example, the input device performs capacitive sensing using an electrode matrix where individual electrodes are arranged in a 2D manner on a common plane. These matrix sensors may be integrated into a display panel of the input device. Because the electrodes are arranged on the same layer or plane to form the matrix, in order to transmit and receive sensing signals the input device includes a trace extending from one or more sides of the layer to each of the electrodes. Because a matrix sensor may include thousands of individual electrodes, identifying sufficient space to route these traces is not an easy task. In one solution, the matrix sensor may include a separate routing layer for the traces which uses vias to connect the traces to the electrodes. However, fabricating these vias is expensive. Alternatively, the traces may be disposed on the same layer that contains the electrodes—e.g., the traces are disposed in routing channels between the electrodes. Although this reduces cost, disposing the traces on the same plane as the electrodes may cause the traces to become capacitively coupled to an input object. This coupling may introduce noise or error into the sensing signals transmitted by the traces, thereby decreasing the ability of the input device to detect the proximity of the input object.

In one embodiment, the input device includes a multi-layered capacitive sensor stack which includes a first layer disposed over a second layer, where the first layer contains electrodes that are electrically floating and the second layer contains the sensor electrodes and the traces described above. In one example, the stack is arranged such that the first layer is between the second layer and a touch surface used for interacting with the input object. The first and second layers may be disposed on either the same substrate or different substrates in the stack.

In one embodiment, the first layer includes electrically floating electrodes as well as at least one guard electrode. These components may align with respective components in the second layer. For example, the electrically floating electrodes in the first layer may be arranged above the sensor electrodes in the second layer. Further, the shape and dimensions of the floating electrodes may substantially match the shape and dimensions of the sensor electrodes such that the electrically floating electrodes cover respective ones of the sensor electrodes when the sensor stack is viewed from the top—i.e., from the perspective of the touch surface looking down towards the first and second layers. By arranging the electrodes as such, the floating and sensor electrodes which are in the separate layers become capacitively coupled. The floating electrodes (which are closer to the touch surface) serve as the main sensors for the sensing stack. As a capacitance between the floating electrodes and the input object changes, this change also affects the capacitance between the floating electrodes and the sensor electrodes. Because the sensor electrodes may be electrically attached to a processing system via the traces, the capacitive changes between the floating electrodes and the sensor electrodes can be measured and used to perform capacitive sensing.

Furthermore, the guard electrode in the first layer may be disposed over one or more of the traces in the second layer which blocks the capacitance associated with the input object and/or the floating electrodes from affecting the sensing signals transmitted on the traces. This arrangement mitigates the issue described above where locating the traces in the same layer or plane as the sensor electrodes may introduce noise into the processing system. In one embodiment, the second layer also includes one or more guard electrodes that may be used to separate (i.e., electrically insulate) the traces from each other as well as separate the traces from the sensor electrodes.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I$^2$C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
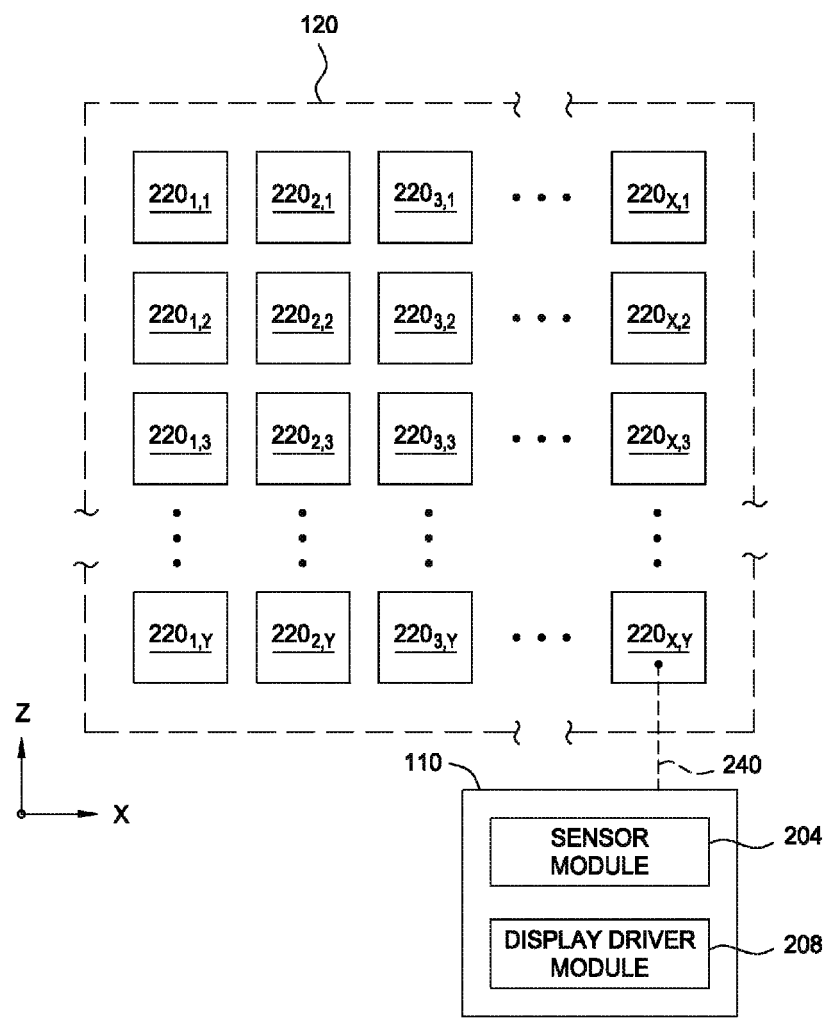
FIG. 2 illustrates a portion of an exemplary pattern of sensing electrodes configured to sense in a sensing region, according to embodiments of the invention.

FIG. 2 illustrates a portion of an exemplary pattern of sensing electrodes 220 configured to sense in the sensing region 120 associated with a pattern, according to some embodiments. For clarity of illustration and description, FIG. 2 shows the sensor electrodes 220 in a pattern of simple rectangles and does not show various other components. The exemplary pattern comprises an array of sensor electrodes $220_{X,Y}$ (referred collectively as sensor electrodes 220) arranged in X columns and Y rows, wherein X and Y are positive integers, although one of X and Y may be zero. It is contemplated that the pattern of sensing electrodes 220 may comprises a plurality of sensor electrodes 220 having other configurations, such as polar arrays, repeating patterns, non-repeating patterns, non-uniform arrays a single row or column, or other suitable arrangement. Further, the sensor electrodes 220 may be any shape such as circular, rectangular, diamond, star, square, noncovex, convex, nonconcave concave, etc. The sensor electrodes 220 are coupled to the processing system 110 and utilized to determine the presence (or lack thereof) of an input object 140 in the sensing region 120.

In some capacitive sensing embodiments, one or more of the sensor electrodes 220 comprise one or more display electrodes used in updating the display of the display screen. In one or more embodiment, the display electrodes comprise one or more segments of a Vcom electrode (common electrodes), a source drive line, gate line, an anode electrode or cathode electrode, or any other display element. These display electrodes may be disposed on an appropriate display screen substrate. For example, the common electrodes may be disposed on a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the common electrode can also be referred to as a "combination electrode", since it performs multiple functions. In various embodiments, each of the sensor electrodes 220 comprises one or more common electrodes. In other embodiments, at least two sensor electrodes 220 may share at least one common electrode.

Continuing to refer to FIG. 2, the processing system 110 coupled to the sensing electrodes 220 includes a sensor module 204 and optionally, a display driver module 208. In one embodiment the sensor module comprises circuitry that drives a transmitter signal or a modulated signal onto, and receives resulting signals with, the sensing electrodes 220 during periods in which input sensing is desired. In one embodiment, the sensor module includes a transmitter module including circuitry configured to drive a transmitter signal onto the sensing electrodes 220 during periods in which input sensing is desired. The transmitter signal is generally modulated and contains one or more bursts over a period of time allocated for input sensing. The transmitter signal may have an amplitude, frequency and voltage which may be changed to obtain more robust location information of the input object in the sensing region 120. The modulated signal used in absolute capacitive sensing may be the same or different from the transmitter signal used in transcapacitive sensing. The sensor module may be selectively coupled to one or more of the sensor electrodes 220. For example, the sensor module 204 may be coupled to selected portions of the sensor electrodes 220 and operate in either an absolute or transcapacitive sensing mode. In another example, the sensor module 204 may be a different portion of the sensor electrodes 220 and operate in either an absolute or transcapacitive sensing mode. In yet another example, the sensor module 204 may be coupled to all the sensor electrodes 220 and operate in either an absolute or transcapacitive sensing mode.

In various embodiments the sensor module 204 may comprise a receiver module that includes circuitry configured to receive a resulting signal with the sensing electrodes 220 comprising effects corresponding to the transmitter signal during periods in which input sensing is desired. In one or more embodiments, the receiver module is configured to drive a modulated signal onto a sensor electrode 220 and receive a resulting signal corresponding to the modulated signal to determine changes in absolute capacitance of the sensor electrode 220. The receiver module may determine a position of the input object 140 in the sensing region 120 or may provide a signal including information indicative of the resulting signal to another module or processor, for example, determination module or a processor of the electronic device 150 (i.e., a host processor), for determining the position of the input object 140 in the sensing region 120. In one or more embodiments, the receiver module comprises a plurality of receivers, where each receiver may be an analog front ends (AFEs).

In one or more embodiments, capacitive sensing (or input sensing) and display updating may occur during at least partially overlapping periods. For example, as a common electrode is driven for display updating, the common electrode may also be driven for capacitive sensing. Or overlapping capacitive sensing and display updating may include modulating the reference voltage(s) of the display device and/or modulating at least one display electrode for a display in a time period that at least partially overlaps with when the sensor electrodes are configured for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiment, the non-display update period may be referred to as a long horizontal blanking period, long h-blanking period or a distributed blanking period. In other embodiments, the non-display update period may comprise horizontal blanking periods and vertical blanking periods. Processing system 110 may be configured to drive sensor electrodes 220 for capacitive sensing during any one or more of or any combination of the different non-display update times.

The display driver module 208 includes circuitry confirmed to provide display image update information to the display of the display device 160 during non-sensing (e.g., display updating) periods. The display driver module 208 may be included with or separate from the sensor module 204. In one embodiment, the processing system comprises a first integrated controller comprising the display driver module 208 and at least a portion of the sensor module 204 (i.e., transmitter module and/or receiver module). In another embodiment, the processing system comprises a first integrated controller comprising the display driver module 208 and a second integrated controller comprising the sensor module 204. In yet another embodiment, the processing system comprises a first integrated controller comprising a display driver module 208 and one of a transmitter module or a receiver module and a second integrated controller comprising the other one of the transmitter module and receiver module.

As discussed above, the sensor electrodes 220 may be formed as discrete geometric forms, polygons, bars, pads, lines or other shape, which are ohmically isolated from one another. The sensor electrodes 220 may be electrically coupled through circuitry to form electrodes of having larger plan area relative to a discrete one of the sensor electrodes 220. The sensor electrodes 220 may be fabricated from opaque or non-opaque conductive materials. In embodiments wherein the sensor electrodes 220 are utilized with a display device, it may be desirable to utilize non-opaque conductive materials for the sensor electrodes 220. In embodiments wherein the sensor electrodes 220 are not utilized with a display device, it may be desirable to utilize opaque conductive materials having lower resistivity for the sensor electrodes 220 to improve sensor performance. Materials suitable for fabricating the sensor electrodes 220 include ITO, aluminum, silver, copper, and conductive carbon materials, among others. The sensor electrodes 220 may be formed as contiguous body of conductive material having little or no open area (i.e., having a planar surface uninterrupted by holes), or may alternatively be fabricated to form a body of material having openings formed therethrough. For example, the sensor electrodes 220 may be formed from a mesh of conductive material, such as a plurality of interconnected thin metal wires. In one embodiment, at least one of the length and width of the sensor electrodes 220 may be in a range of about 1 to about 10 mm. In other embodiments, at least one of the length and width of the sensor electrodes may be less than about 1 mm or greater than about 10 mm. In other embodiment, the length and width may not similar, and one of the length and width may be in the range of about 1 to about 2 mm. Further, on various embodiments, the sensor electrodes 220 may comprise a center to center pitch in the range of about 4 to about 20 mm; however, in other embodiments, the pitch may be less than about 4 mm or greater than about 20 mm. Further, in various embodiments the sensor electrode comprises the entire Vcom electrode (common electrode(s)).

Figure 3A:
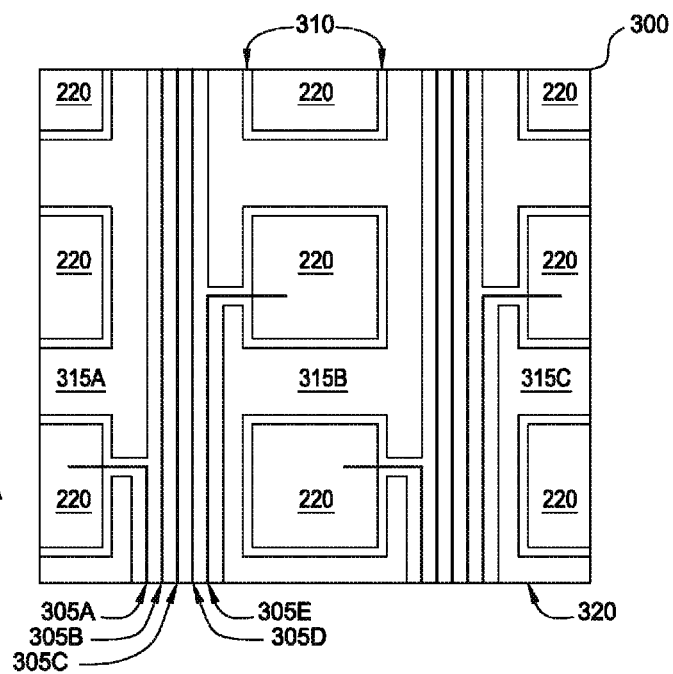
FIGS. 3A-3B illustrate two layers in a multi-layered sensing stack, according to embodiments of the invention.
Figure 3B:
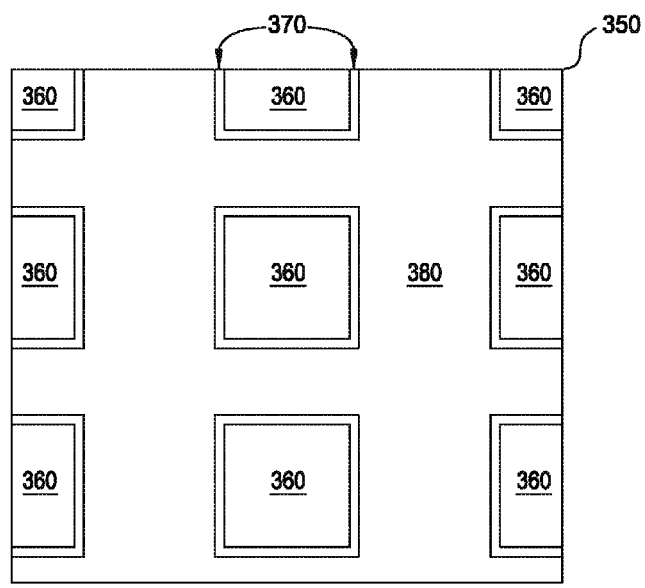

FIGS. 3A-3B illustrate two layers in a sensing stack, according to embodiments of the invention. Specifically, FIG. 3A illustrates a bottom layer 300 while FIG. 3B illustrates a top layer 350 of the stack. More specifically, FIG. 3A illustrates an enlarged portion of the sensing region 120 in FIG. 2. As shown, the electrodes 220 are surrounded by an insulative region 310 except where a respective trace 305 is coupled to each electrode 220. The insulative region 310 ohmically separates the electrodes 220 from each other as well as the guard electrodes 315. The insulative region 310 may be any suitable dielectric material or an air gap that physically separates the components in the bottom layer 300.

The traces 305 extend through a routing channel defined by the spacing between two adjacent columns of electrodes 220. However, in other embodiments, the routing channels and the traces 305 may extend between rows of the electrodes 220. As shown here, trace 305A and trace 305E couple to electrodes 220 shown in FIG. 3A while traces 305B-D couple to electrodes in the bottom layer 300 outside the view of FIG. 3A (i.e., electrodes further up the columns). In this embodiment, the traces 305 are routed in the space between the electrodes 220 coupled to the traces 305 and the adjacent column(s) in a same direction. That is, each trace 305 extends away from the electrode 220 to which it is connected towards a common side 320. Thus, all of the traces 305 are routed towards the same side 320. The common side 320 may serve as a coupling interface between the traces 305 and the processing system which transmits and receives capacitive sensing signals to the electrodes 220 using the traces 305. Although FIG. 3A illustrates routing the traces 305 to the common side 320, in other embodiments, a portion of the traces 305 may be routed in a different direction. For example, the electrodes 220 in the top of half of the sensing region may be routed to a top side while the electrodes 220 in the bottom half are routed to a bottom side of sensing region. However, in other embodiments, the traces are routed on another layer that is beneath the electrodes 220 in layer 300 rather than routing between the electrodes 220. In this case, the traces are connected to electrodes 220 using vias.

In one embodiment, at least a portion of the traces 305 are routed to one or more touch controllers. The traces 305 may be connected to the touch controllers using multiplexers which permit more traces 305 to couple to a touch controller than there are receivers in the controller. The multiplexers may be located between the touch controllers and the vias or be integrated into the controllers.

In FIG. 3A, the traces 305 alternate between the left and right sides for each sequential sensor electrodes 220 as the columns are traversed. That is, trace 305E which is coupled to the middle sensor electrode 220 in the middle column is routed on the left side of the column, while the trace coupled to the bottom electrode in the middle column is routed on the right side of the column. However, instead of alternating where the trace 305 is routed for every other sensor electrode 220, a group of sensor electrodes 220 in the column may route on the same side. For example, the first three sensor electrodes 220 in a column may be coupled to traces 305 on the right side of the column, while the next three sensor electrodes 220 are routed on the left side of the column. In another embodiment, the traces 305 for a particular column may all be routed on the same side.

FIG. 3B illustrates the top layer 350 of the sensing stack and includes electrically floating electrodes 360 that are ohmically separated from a guard electrode 380 via insulative regions 370. Unlike the sensor electrodes 220 in the bottom layer 300, floating electrodes 360 are not connected to the processing system and are not driven with capacitive sensing signals. In one embodiment, the top layer 350 does not include any traces that are coupled to the floating electrodes 360. As shown, the insulative regions 370 (which may include a dielectric material or an insulative air gap) completely surround the electrodes 360 thereby ohmically separating the electrodes 360 from the other components on the top layer 350.

In one embodiment, the top layer 350 in FIG. 3B is arranged over the bottom layer 300 illustrated in FIG. 3A such that the floating electrodes 360 are aligned with the sensor electrodes 220. That is, the floating electrodes 360 are at least partially disposed over the sensor electrodes 220. In one embodiment, the physical dimensions (i.e., length and width) and the shape of the floating electrodes 360 substantially matches the dimensions and shape of the sensor electrodes 220. Thus, when the floating electrodes 360 are aligned over the sensor electrodes 220 in the stack, the floating electrodes 360 may completely cover the sensor electrodes 220 when viewed from the top of the sensing stack. As used herein, the term "substantially match" means the physical dimensions may vary such that the length or width of the electrodes 220, 360 may be slightly different (e.g., less than 5-10%) or that the respective shapes may be slightly different. For example, the floating electrodes 360 may be a rectangular shape with square corners, while the sensor electrodes 220 is a rectangular shape with rounded corners, or one electrode may be a circle while the other is an oval. In one embodiment, the electrodes 220 and 360 may be arranged such that the geometric centers of the electrodes 220, 360 are aligned in the stack.

Because at least a portion of each of the floating electrodes 360 covers at least a portion of a respective one of the sensor electrodes 220, the electrodes 220, 360 are capacitively coupled (assuming the distance between the electrodes is not too great). The floating electrodes 360 serve as the main sensing elements that capacitively couple an input object proximate to the sensing stack. As the capacitance between the floating electrodes 360 and the input object changes, this change also affects the capacitance between the floating electrodes 360 and the sensor electrodes 220. That is, the capacitance between the floating and sensor electrodes 220, 360 is dependent on the capacitance between the floating electrodes 360 and the input object. Because the sensor electrodes 220 are attached to a processing system via the traces 305, the capacitive change between the floating electrodes 360 and the sensor electrodes 220 can be measured and used to perform capacitive sensing.

In addition to aligning the sensor electrodes 220 with the floating electrodes 360, the guard electrode 380 may be disposed over the traces 305. Because the traces 305 are located on the same layer or plane as the sensor electrodes, the traces 305 may be capacitively coupled to the input object or the floating electrodes 360. This capacitive coupling can introduce noise or other unwanted signals onto the capacitive sensing signals transmitted by the traces 305. By aligning the guard electrode 380 above the traces 305, the guard electrode 380 blocks or mitigates the capacitive coupling between traces 305 and the floating electrode 360 or input object 140.

In the embodiment shown, the guard electrode 380 may be a single electrode in layer 350 that surrounds the floating electrodes 360. The layer 350 may include one or more electrical connections to the guard electrode 380 which permits the processing system (or some other system in the input device) to drive a guarding signal onto electrode 380 when performing capacitive sensing. This guarding signal aids in preventing the traces 305 from becoming capacitively coupled to other components in the stack or the input object, thereby preventing unwanted signals from being introduced onto the traces 305. However, in another embodiment, the guard electrode 380 may not have a direct electrical connection to a guard signal—i.e., is electrically floating. For example, the guard signal may be introduced onto the guard electrode 380 by capacitive coupling rather than a direct electrical connection.

The processing system may use transcapacitive or absolute capacitance sensing techniques in order to measure the change in capacitance between the sensor electrodes 220 and the floating electrodes 360. If the sensor electrodes 220 are driven with the same modulated signal as the guard electrodes 315, 380, then absolute capacitance may be measured. Alternatively, the processing system may hold the sensing electrodes 220 at virtual ground to measure the transcapacitance. For example, the sensing electrodes 220 may be held at a virtual ground while the guard electrodes 315, 380 are driven with a modulated signal (or, alternatively, the guard electrodes 315, 380 can be held at virtual ground while the sensing electrodes 220 are driven with the modulated signal). Moreover, when performing transcapacitive sensing, the configuration shown in FIGS. 3A and 3B does not require scanning of multiple transmitters as is the traditional approach. Rather, entire areas can be sensed simultaneously depending on the number of receivers in the sensor module 204 in FIG. 2. Regardless whether transcapacitive or absolute capacitive sensing is used, by measuring the resulting signals, the processing system detects a change in capacitance caused by the input object (whether the object contacts a touch surface in the sensing stack or is hovering above the touch surface).

As above, the guard signal (or shield signal) may include a similar amplitude and phase as a modulated signal driven on the sensor electrodes 220 when performing absolute capacitive sensing. In one embodiment, the guard signal has an amplitude that is greater or less than the amplitude of the modulated signal driven on the sensor electrodes 220. Moreover, the processing signal may drive the guard electrode 380 in top layer 350 and the guard electrodes 315 in bottom layer 300 such that the same guard voltage (or common voltage) is present on both electrodes 315, 380. Regardless whether the guard electrodes 315, 380 are driven with a modulated signal or held at a constant (i.e., DC) voltage, the guard signal isolates the measured charges of different electrodes from each other and shields the sensor electrodes 220 and traces 305 from ground (through the input object) which may improve the signal to noise ratio.

Figure 4A:
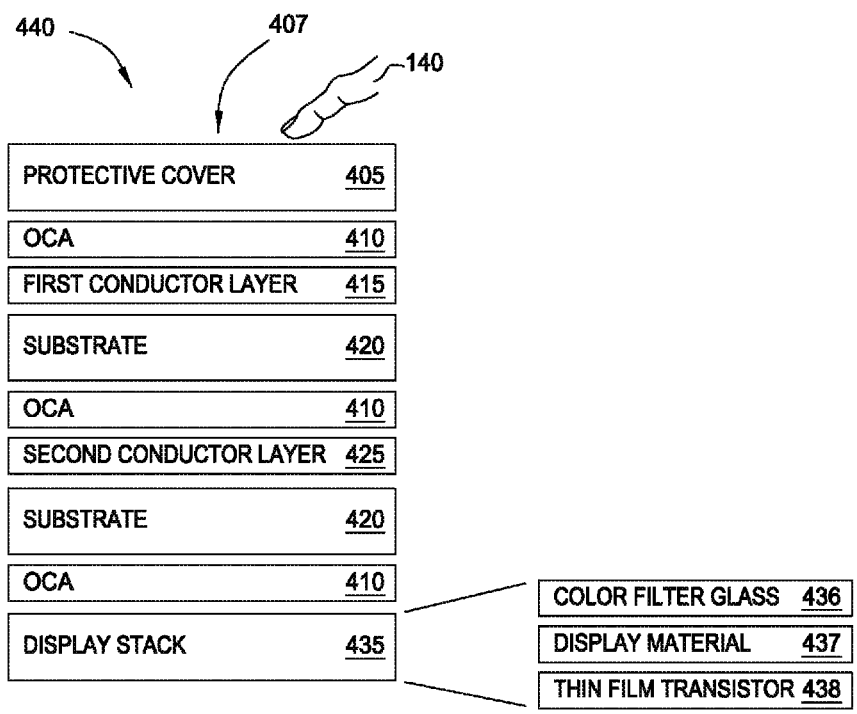
FIGS. 4A-4C illustrate side view of various sensing stacks, according to embodiments of the invention.
Figure 4B:
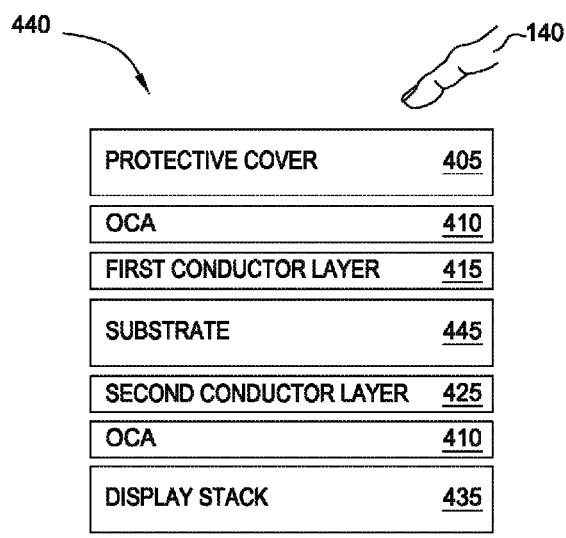
Figure 4C:
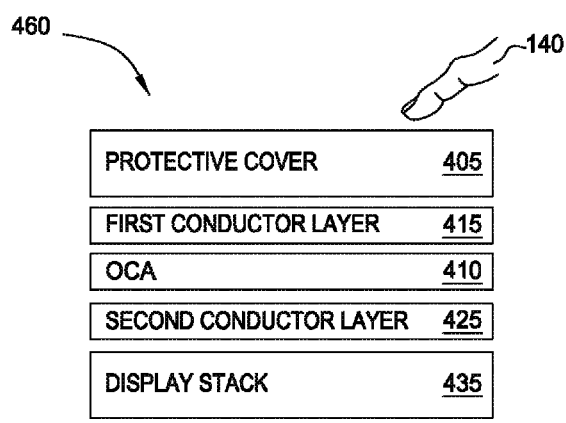

FIGS. 4A-4C illustrate side view of various sensing stacks, according to embodiments of the invention. FIG. 4A illustrates a sensing stack 400 that includes a protective cover 405, a first conductor layer 415, a substrate 420, a second conductor layer 425, a substrate 430, and a display stack 435. As used herein, the first and second conductor layers 415, 425 refer to the top and bottom layers shown in FIGS. 3A and 3B, respectively. That is, the first conductor layer 415 includes the floating electrodes 360 and guard electrode 380 shown in FIG. 3B, while the second conductor layer 425 includes the sensor electrodes 220 and traces 305 shown in FIG. 3A.

The protective cover 405 (also referred to as a cover lens or hardened polarizer) may be formed from a glass, plastic, or polymer material. The protective cover 405 includes a touch surface 407 for interacting with one or more input objects. In one embodiment, the touch surface 407 establishes the sensing region 120 for the input device 100 shown in FIG. 1. In one example, the protective cover 405 may be an outer surface of the input device (e.g., a touch interface). Thus, the first conductor layer 415, which includes the floating electrodes, is closer to the touch surface 407 than the second conductor layer 425. As discussed above, the floating electrodes in the first conductor layer 415 serve as the main sensors which are capacitively coupled to an input object via the touch surface 407 as well as the sensor electrodes in the second conductor layer 425. As described above, the processing system (not shown) transmits capacitive sensing signals onto, and receives resulting signals from, the sensor electrodes in the second conductor layer 425 using transcapactive or absolute sensing techniques.

In this embodiment, the first conductor layer 415 is disposed on substrate 420 while the second conductor layer 425 is disposed on substrate 430. The substrates 420 and 430 may be a plastic (e.g., polyethylene terephthalate (PET)), glass, or other transparent material that permits a user to view the display stack 435 underneath. In one embodiment, the first and second layers 415, 425 are deposited onto the respective surfaces of the substrates 420, 430. Alternatively, the layers 415, 425 are laminated onto the substrates 420, 430. Furthermore, although FIG. 4A illustrates disposing the conductor layers 415, 425 onto the surfaces closet to the protective cover 405, in other examples the conductor layers 415, 425 are disposed on the surfaces of substrates 420, 430 that are closest to the display stack 435. Furthermore, stack 400 also includes optically clear adhesive (OCA) layers 410 which bind together the various layers in the stack 400.

The display stack 435 includes layers and components for displaying an image to a user. As such, the layers above display stack 435 in the stack 400 are substantially transparent such that a user viewing the touch surface 407 can view the image displayed by the display stack 435. In one embodiment, the display stack 435 includes a color filter glass 436, display material 437, and thin film transistor layer 438, although the display stack 435 can include more or less than these layers. In one embodiment, display material 437 establishes a plurality of display pixels for displaying the image. The display material 437 may be part of a light emitting diode (LED), organic LED (OLED), cathode ray tube (CRT), liquid crystal display (LCD), plasma, electroluminescence (EL), or other display technology. The thin film transistor layer 438 drives the pixels in the display material 437 for displaying the image. Although not shown, the display stack 435 may be coupled to one or more display drivers which are part of the processing system or separate therefrom.

FIG. 4B illustrates a sensing stack 440 that includes only one substrate 445 rather than two as shown in stack 400. Nonetheless, substrate 445 may be made of the same materials as the substrates in FIG. 4A (e.g., glass, plastic, etc.). As shown, the first and second conductor layers 415, 425 are disposed on opposite surfaces of the substrate 445. That is, instead of being disposed on separate substrates, the conductor layers 415, 425 are disposed (e.g., deposited or laminated) on the same substrate 445.

FIG. 4C illustrates a sensing stack 460 that does not include any separate substrates between the protective cover 405 and display stack 435. In this embodiment, the first and second conductor layers 415, 425 are disposed on the protective cover 405 and the display stack 435. Specifically, the first conductor layer 415 is disposed (e.g., deposited or laminated) onto the cover 405, while the second conductor layer 425 is disposed (e.g., deposited or laminated) onto the display stack 435. For example, the second conductor layer 425 may be disposed on the color filter glass within the display stack 435.

Figure 5:
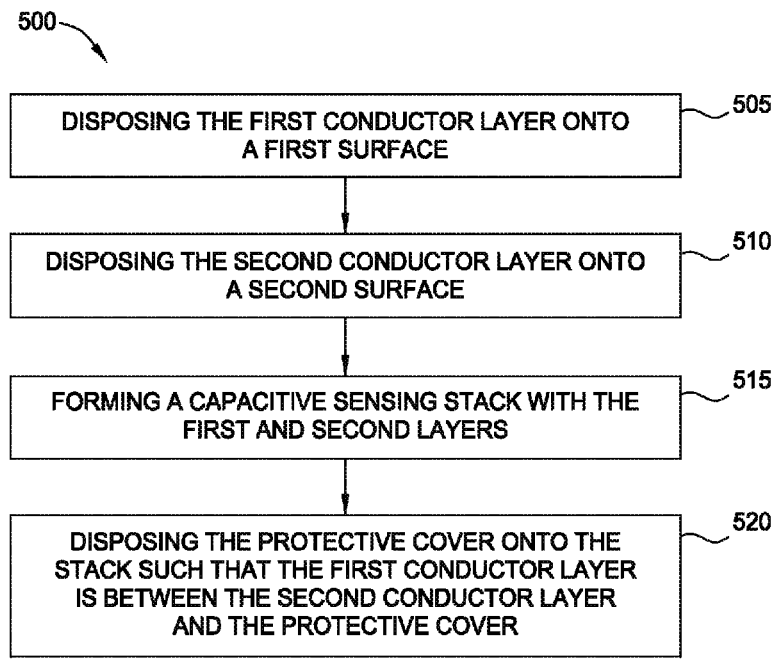
FIG. 5 is a method for fabricating the sensing stack, according to an embodiment of the invention.

FIG. 5 is a method 500 for fabricating the sensing stack, according to an embodiment of the invention. At block 505, the first conductor layer is disposed onto a first surface. As shown in FIGS. 4A-4C, the first surface may be on the protective cover in sensing stack or a separate substrate that is between the protective cover and the display stack.

At block 510, the second conductor layer is disposed on a second surface in the sensing stack. The second surface may be a surface in the display stack or on a substrate between the cover and display stack—e.g., the same substrate that includes the first surface or a different substrate. At block 515, the sensing stack is formed which includes the first and second conductor layers. That is, the first and second surfaces are arranged such that the spatial relationship between the first and second conductor layers is fixed. If the first and second conductor layers are deposited onto the same substrate, the spatial relationship between these layers becomes fixed when they are disposed on the shared substrate. However, when the first and second conductor layers are deposited on different substrates, then block 515 is a separate processing step where the different substrates are attached to each other thereby fixing the spatial relationship between the first and second conductor layers.

At block 520, the protective cover is disposed on the sensing stack such that the first layer is between the second conductor layer and the protective cover. In one embodiment, the first and second conductor layers are disposed on the first and second surfaces before the protective cover is attached. However, if the first conductor layer is disposed on the protective cover, then blocks 515 and 520 may be performed as a single step where the protective cover is attached to the surface on which the second conductor layer is disposed (i.e., a surface in the display stack). However, when the first and second conductor layers are disposed on respective substrates between the cover and the display stack, then blocks 515 and 520 may be two separate processing steps where the spatial relationship between the conductor layers is fixed in a first step and then the protective cover is added to the sensing stack in a second step.

In one embodiment, the sensing stack is attached to a display stack which displays an image to the user. For example, the first and second conductor layers are arranged between the display stack and the protective cover establishing the touch surface. However, in other embodiments, the multi-layered sensing stack may be used independent of a display stack. For example, the sensing stack may be used as a touch pad for controlling an input device (e.g., a cursor).

Figure 6:
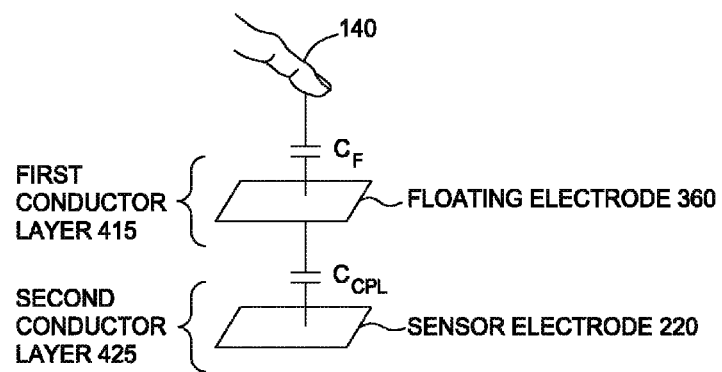
FIG. 6 illustrates coupling capacitance between an input object and the layers in the sensing stack, according to an embodiment of the invention.

FIG. 6 illustrates coupling capacitance between input object 140 and the layers in the sensing stack, according to an embodiment of the invention. As shown, the first conductor layer 415 which includes the floating electrodes 360 is closer to the input object 140 than the sensor electrodes 220 in the second conductor layer 425. As the input object 140 approaches the floating electrodes 360, they become capacitively coupled as shown by capacitance $C_F$. Because of the close proximity between floating electrode 360 and sensor electrode 220, these electrodes are capacitive coupled as shown by capacitance $C_{CPL}$. As described above, changes to $C_F$ cause corresponding changes to $C_{CPL}$ which is then measured by the processing system coupled to the sensor electrode 220.

In one embodiment, the separation distance between the first and second conductor layers 415, 425 is between 25 to 200 microns. In another embodiment, the conductor layers 415, 425 are separated by 50 to 100 microns. For example, if conductor layers 415, 425 are separated by 100 microns and the dimensions of the sensor and floating electrodes 220, 360 are 5 mm by 5 mm, then $C_{CPL}$ is approximately 2 pF. The series capacitance of $C_F$ and $C_{CPL}$ is approximately equal to $C_F$ for values where $C_F \ll C_{CPL}$. When the input object 140 is hovering above the floating electrode 360, $C_F$ is on the order of tens of fempto farads. Even when touching, $C_{CPL}$ approximately equals $C_F$ which divides the series capacitance only by about half which still results a large capacitive signal to be measured.

Thus, the embodiments and examples set forth herein were presented in order to best explain the embodiments in accordance with the present technology and its particular application and to thereby enable those skilled in the art to make and use the present technology. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

We claim:

1. A capacitive sensing device, comprising:
    a first layer in a sensing stack, the first layer comprising an electrically floating electrode and a first guard electrode, wherein the first guard electrode surrounds the floating electrode, and wherein the floating electrode is not connected to any routing traces;
    a second layer in the sensing stack ohmically insulated from the first layer, the second layer comprising a sensor electrode coupled to a routing trace, wherein the floating electrode at least partially overlaps the sensor electrode in the sensing stack, and the first guard electrode at least partially overlaps the routing trace in the sensing stack; and
    a processing system coupled to the sensor electrode via the routing trace, the processing system is configured to:
        drive sensing signals onto the routing trace for performing capacitive sensing; and
        drive a guarding signal onto the first guard electrode which mitigates capacitive coupling between the routing trace and other components in the capacitive sensing device.

2. The capacitive sensing device of claim 1, wherein the second layer comprises a second guard electrode disposed between the sensor electrode and the routing trace.

3. The capacitive sensing device of claim 2, wherein the processing system is coupled to the first and second guard electrodes in the first and second layers, wherein the processing system is configured to drive the first and second guard electrodes in the first and second layers using respective guard signals to shield the sensor electrode.

4. The capacitive sensing device of claim 1, wherein the sensing stack comprises a display stack, wherein the second layer is directly disposed on a substrate in the display stack.

5. The capacitive sensing device of claim 4, wherein the substrate is a color filter glass.

6. The capacitive sensing device of claim 1, wherein the sensing stack comprises a protective cover, wherein the first layer is directly disposed on the protective cover, and wherein the first layer is between the protective cover and the second layer.

7. The capacitive sensing device of claim 1, wherein the sensing stack comprises a substrate, wherein the first and second layers are disposed on opposite sides of the substrate.

8. The capacitive sensing device of claim 1, wherein the sensing stack comprises a first substrate and a second substrate, wherein the first layer is directly disposed on the first substrate and the second layer is directly disposed on the second substrate.

9. The capacitive sensing device of claim 1, wherein a shape, length, and width of the floating electrode are substantially the same as a shape, length, and width of the sensor electrode.

10. The capacitive sensing device of claim 1, wherein each of the routing traces is coupled to the processing system via a same side of the second layer.

11. A capacitive sensing stack, comprising
    a first layer comprising an electrically floating electrode and a first guard electrode, wherein the first guard electrode surrounds the floating electrode, and wherein the floating electrode is not connected to any routing traces;
    a second layer ohmically insulated from the first layer, the second layer comprising a sensor electrode coupled to a routing trace, wherein the floating electrode at least partially overlaps the sensor electrode in the capacitive sensing stack, and the first guard electrode at least partially overlaps the routing trace in the capacitive sensing stack;

a protective cover providing a touch surface, wherein the first layer is between the protective cover and the second layer; and a processing system configured to drive a guarding signal onto the first guard electrode which mitigates capacitive coupling between the routing trace and other components in a capacitive sensing device.

12. The capacitive sensing stack of claim 11, wherein the first layer is directly disposed on a side of the protective cover opposite of the touch surface.

13. The capacitive sensing stack of claim 11, further comprising a display stack, wherein the first and second layers are disposed between the protective cover and the display stack.

14. The capacitive sensing stack of claim 13, wherein the second layer is disposed directly on a substrate in the display stack.

15. The capacitive sensing stack of claim 11, wherein the second layer comprises a second guard electrode disposed between the sensor electrode and the routing trace.

16. The capacitive sensing stack of claim 11, wherein a shape, length, and width of the plurality of electrically floating electrodes are substantially the same as a shape, length, and width of the sensor electrodes.

17. A method, comprising:

disposing a first layer onto a first surface, wherein the first layer comprises a plurality of electrically floating electrodes and a first guard electrode, wherein the first guard electrode surrounds the plurality of electrically floating electrodes, and wherein the plurality of electrically floating electrodes are not connected to any routing traces;

disposing a second layer onto a second, different surface, wherein the second layer comprises a plurality of sensor electrodes each coupled to a respective routing trace;

forming a capacitive sensing stack comprising the first and second layers, wherein each of the plurality of electrically floating electrodes at least partially overlaps a corresponding one of the sensor electrodes in the capacitive sensing stack, and the first guard electrode at least partially overlaps a first routing trace of the routing traces in the capacitive sensing stack, wherein the first guard electrode is configured to, when driven using a guarding signal, mitigate capacitive coupling between the first routing trace and other components in a capacitive sensing device; and disposing a protective cover onto the capacitive sensing stack such that the first layer is between the protective cover and the second layer, wherein the protective cover comprises a touch surface.

18. The method of claim 17, further comprising:

disposing a display stack onto the capacitive sensing stack such that the first and second layers are between the protective cover and the display stack.

19. The method of claim 18, wherein the second surface is one of: (i) a surface of the display stack and (ii) a surface of a substrate disposed between the protective cover and the display stack.

20. The method of claim 18, wherein the first surface is one of: (i) a surface of the protective cover and (ii) a surface of a substrate disposed between the protective cover and the display stack.

21. The capacitive sensing device of claim 1, wherein the first guard electrode entirely surrounds the at least one floating electrode in the first layer.

* * * * *